United States Patent [19]

Frey

[11] 4,218,227
[45] Aug. 19, 1980

[54] DUST COLLECTOR

[75] Inventor: Robert E. Frey, Excelsior, Minn.

[73] Assignee: Donaldson Company, Inc., Minneapolis, Minn.

[21] Appl. No.: 19,787

[22] Filed: Mar. 12, 1979

Related U.S. Application Data

[63] Continuation of Ser. No. 847,255, Oct. 31, 1977, abandoned, which is a continuation of Ser. No. 599,787, Jul. 28, 1975, abandoned, which is a continuation-in-part of Ser. No. 486,215, Jul. 5, 1974, abandoned.

[51] Int. Cl.$^2$ .................... B01D 27/06; B01D 27/12
[52] U.S. Cl. ........................................ 55/302; 55/478; 55/484; 55/498; 55/499; 55/502; 55/510; 55/521
[58] Field of Search ............... 55/284, 293, 301–302, 55/350, 478, 484, 498–499, 502, 510, 521; 210/333 R, 333 A, 411, 484, 487, 493

[56] References Cited

U.S. PATENT DOCUMENTS

| | | | |
|---|---|---|---|
| 2,591,198 | 4/1952 | Ringe | 55/498 X |
| 2,748,948 | 6/1956 | Fricke et al. | 210/411 X |
| 2,836,257 | 5/1958 | Muller | 55/504 |
| 3,095,290 | 6/1963 | Hockett | 55/502 |
| 3,234,714 | 2/1966 | Rymer et al. | 55/302 X |
| 3,325,978 | 6/1967 | Rymer et al. | 55/302 X |
| 3,394,532 | 7/1968 | Oetiker | 55/302 |
| 3,402,881 | 9/1968 | Moore et al. | 55/302 X |
| 3,487,609 | 1/1970 | Caplan | 55/96 |
| 3,508,383 | 4/1970 | Humbert, Jr. et al. | 55/502 X |
| 3,535,852 | 10/1970 | Hirs | 55/302 |
| 3,692,184 | 9/1972 | Miller, Jr. et al. | 55/498 X |
| 3,726,066 | 4/1973 | Colley et al. | 55/302 |
| 3,732,669 | 5/1973 | Chambers | 55/341 X |
| 3,735,566 | 5/1973 | Laliwala | 55/284 X |
| 3,757,497 | 9/1973 | Ray | 55/302 |
| 3,807,150 | 4/1974 | Maracle | 55/498 |
| 3,831,354 | 8/1974 | Bakke | 55/341 X |
| 3,853,509 | 12/1974 | Leliaert | 55/341 |
| 3,883,331 | 5/1975 | Bernard et al. | 55/521 X |

FOREIGN PATENT DOCUMENTS

| | | | |
|---|---|---|---|
| 1228130 | 11/1966 | Fed. Rep. of Germany . | |
| 1407933 | 4/1972 | Fed. Rep. of Germany . | |
| 1184609 | 7/1959 | France | 55/284 |
| 1413752 | 8/1965 | France . | |
| 1590764 | 5/1970 | France . | |
| 326047 | 3/1930 | United Kingdom | 55/508 |
| 662358 | 12/1951 | United Kingdom . | |
| 781194 | 8/1957 | United Kingdom | 55/499 |
| 838523 | 6/1960 | United Kingdom . | |
| 880043 | 10/1961 | United Kingdom | 55/302 |
| 914187 | 12/1962 | United Kingdom . | |
| 939641 | 10/1963 | United Kingdom . | |
| 948705 | 2/1964 | United Kingdom . | |
| 1113154 | 5/1968 | United Kingdom . | |
| 1220174 | 1/1971 | United Kingdom | 55/510 |
| 1345977 | 2/1974 | United Kingdom . | |

OTHER PUBLICATIONS

*The Amazing Story of the Absolute Filter*, Bulletin 104, Cambridge Filter Corp., Syracuse, N.Y. 1963.
*Widest Range of Filters for Industry*, Bulletin E25B, Pall Trinity Micro Corp., Cortland, N.Y.
Nonhebel, g. "Gas Purification Processes," pp. 496–497.

*Primary Examiner*—Kathleen J. Prunner
*Attorney, Agent, or Firm*—Merchant, Gould, Smith, Edell, Welter & Schmidt

[57] ABSTRACT

The size of an air filter is greatly reduced compared to the size of conventional bag house type filters by the use of pleated paper filter elements grossly derated to withstand the sudden pulsating forces inherent in reverse jet cleaning.

9 Claims, 5 Drawing Figures

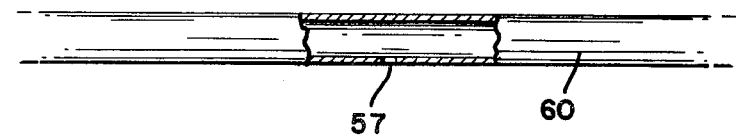
FIG. 4
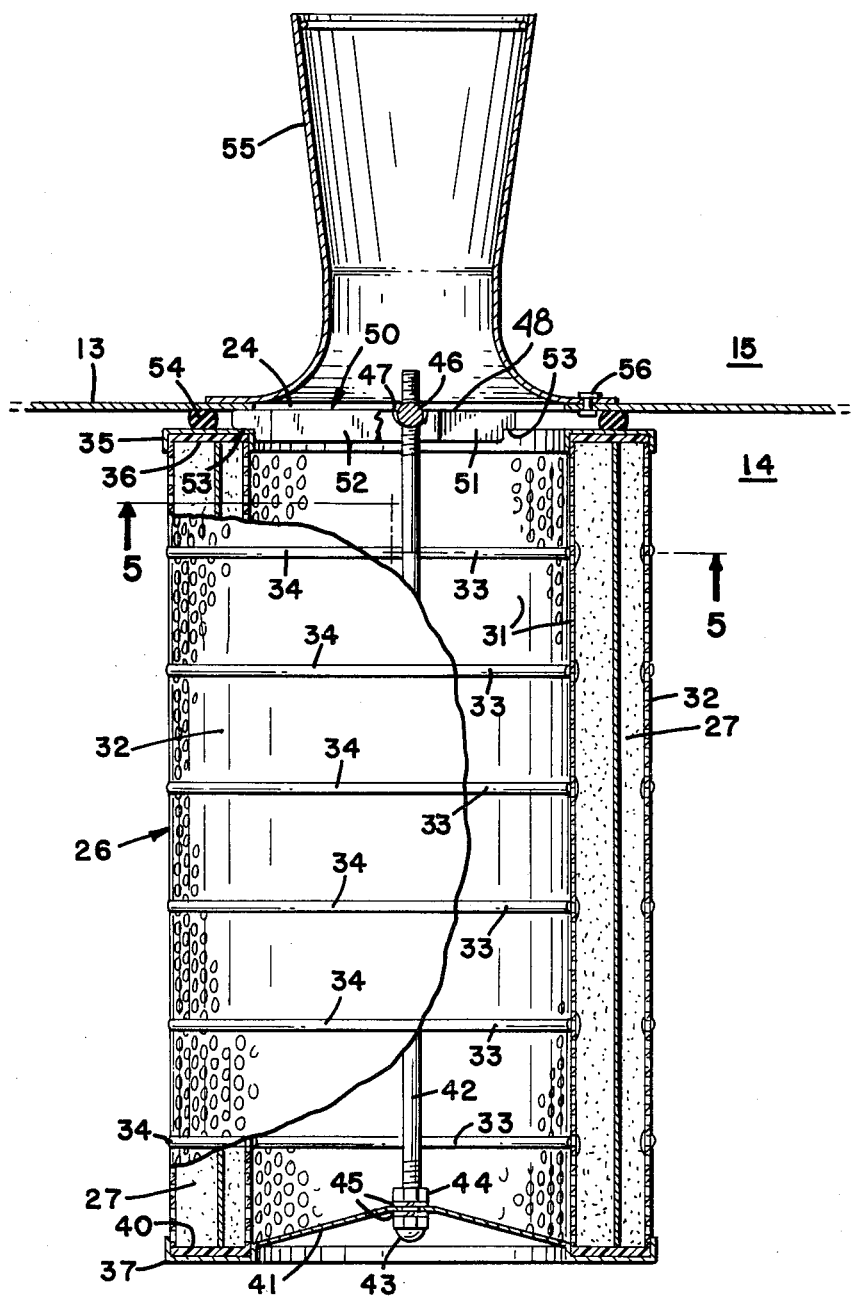

DUST COLLECTOR

CROSS REFERENCE TO RELATED APPLICATIONS

This application is a continuation of application Ser. No. 847,255, filed Oct. 31, 1977, now abandoned, which was a continuation of application Ser. No. 599,787, filed July 28, 1975, now abandoned, which was a continuation-in-part of application Ser. No. 486,215, filed July 5, 1974, now abandoned.

BACKGROUND OF THE INVENTION

The current interest in avoidance of air pollution has in a sense only emphasized an ongoing trend to prevent massive discharge of particulate matter, often of commercial value, into the ambient atmosphere. Air filters of many types are known, more or less specially adapted for widely varying uses.

There are numerous situations where a large volume of a fluid such as air laden with particulate matter must be treated on a continuous basis at a predetermined rate in terms of volume per unit time. In order to handle a large volume per unit of time, i.e. several thousand cubic feet per minute, a large filter area must be available, and even then a very considerable pressure drop takes place across the filter. From a practical viewpoint it is necessary that some form of continuous cleaning of the filter medium be provided, as duplication of equipment to permit shutdown for cleaning is prohibitively expensive both in cost and in space, while the period of operation of a filter unit before its efficiency is reduced to an intolerable level by the matter accumulated thereon is not long.

A standard way of constructing air filters has been to provide a housing divided into inlet and clean air chambers by a partition having a plurality of apertures. A sock or bag of suitable fabric, often on a wire frame, is suspended in each aperture, and a suitable pump or blower causes air flow through the bags, so that the undesired particulate matter collects on the outer surfaces of the bags. Cleaning is accomplished by directing brief jets of air into the bags, a few at a time, in a predetermined sequence, thus reversing the flow through the bags and subjecting them to a minor physical shaking. This removes the deposited material, most of which falls to the bottom of the inlet chamber for removal either intermittently or continuously with a rotary air lock.

In a typical example, a filter of this sort to handle approximately 8000 cubic feet of air per minute with a flow velocity of 8-10 cubic feet per minute per square foot of area of medium (which corresponds to an air flow velocity through the filter media of 8-10 feet per minute), requires 770 square feet of bag surface, a total of 81 bags 4½ inches in diameter and 8 feet long. Thus even apart from the continuous cleaning components, the filter elements alone occupy a housing of very considerable size.

It also became obvious very quickly that the filter bags and their supporting frames, are bulky and awkward to deal with, difficult to install and replace, and subject to rapid wear.

Efforts have been made to find substitutes for filter bags, and some of these alternatives have been successful to a limited extent in laboratory situations. Thus porous metal and ceramic media turned out to have too low a capacity, and woven metal media are prohibitively expensive. Pleated filters made of paper gave some promise, but had too short a lifetime to be practical.

SUMMARY OF THE INVENTION

The present invention greatly reduces the dimensions of air filters and increases their convenience and efficiency by the use of pleated paper filter elements having special structure to extend their service life, by operating the filter elements at a derated flow velocity (i.e. each filter element is operated at a derated flow velocity as compared to its rated velocity for its normal filtering function), and by providing improved means for mounting the elements in readily replaceable fashion. The elements in question were developed for the entirely different field of protecting the engines of motor vehicles such as trucks and off-the-road vehicles from road dust and other particulate matter, and accordingly are of suitably rugged construction for that purpose. In their intended use, however, they were not subject to the rigors of reverse jet cleaning.

It is the discovery of this invention that these pleated paper filters, when grossly derated, i.e., when subjected to a reduced flow velocity of 1-3 cubic feet per minute per square foot of filter area (which corresponds to an air flow velocity through the filter media of 1-3 feet per minute as compared to the normal flow velocity of 8-10 feet per minute), are comparable to cloth bags in volume of air handled, can withstand the stresses of continuous cleaning by reverse jets, and markedly reduce the total size of a filter unit, often by a factor of two. Sixteen of such elements present 3060 square feet of filtering surface (each filter element thus having a known filter area of about 191 square feet), a height of 28 inches rather than 8 feet, and replace the 81 bags mentioned above. It can be seen that by replacing the 81 bags in the prior art filter with 16 pleated paper filter elements, the total filter area of the filter unit has been increased by a factor of about four (from 770 square feet to 3060 square feet) as compared to the prior art bag filter, so that if the same volume of air per minute is handled by the filter unit the flow velocity through the filter elements is correspondingly reduced (i.e. the filter elements are derated) by a factor of about four to approximately one-quarter of the normal rated velocity. The pleated paper filters are also less expensive than the cloth bags.

It is accordingly an object of the invention to provide a new and improved air filter capable of handling large volumes of air while occupying a smaller space than previous filters. Another object is to provide such a filter capable of using pleated paper filter elements at derated velocities.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing

FIG. 4 is a fragmentary sectional view taken along the axis of a filter element.

DESCRIPTION OF THE PREFERRED EMBODIMENT

Figure 2:
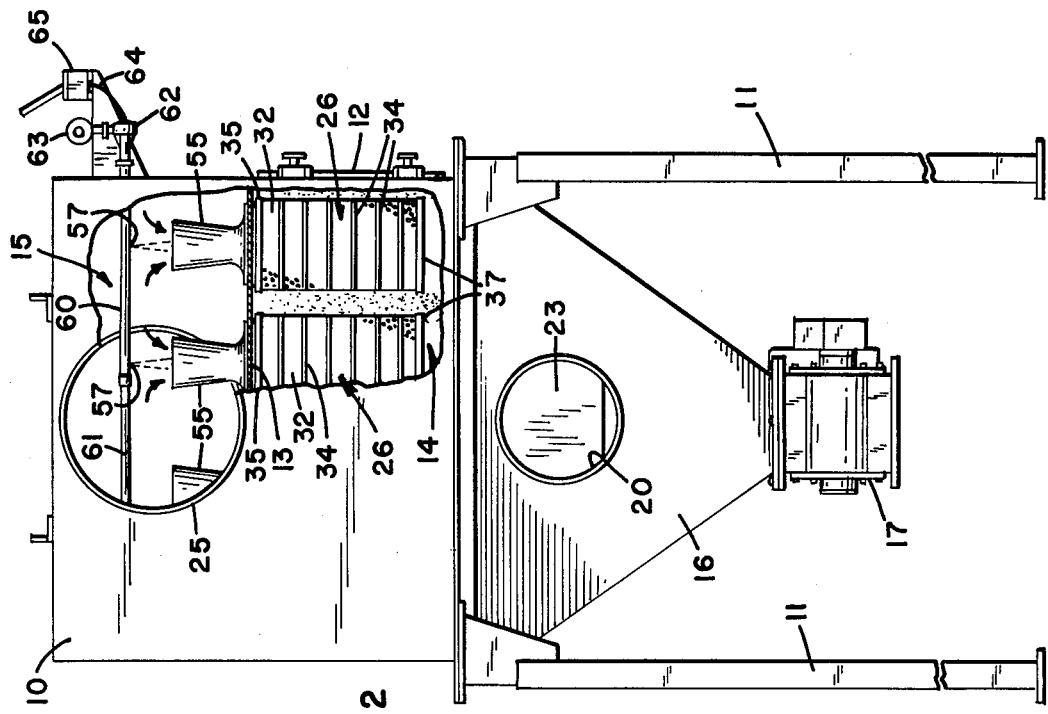
FIG. 2 is a similar side elevation.
Figure 1:
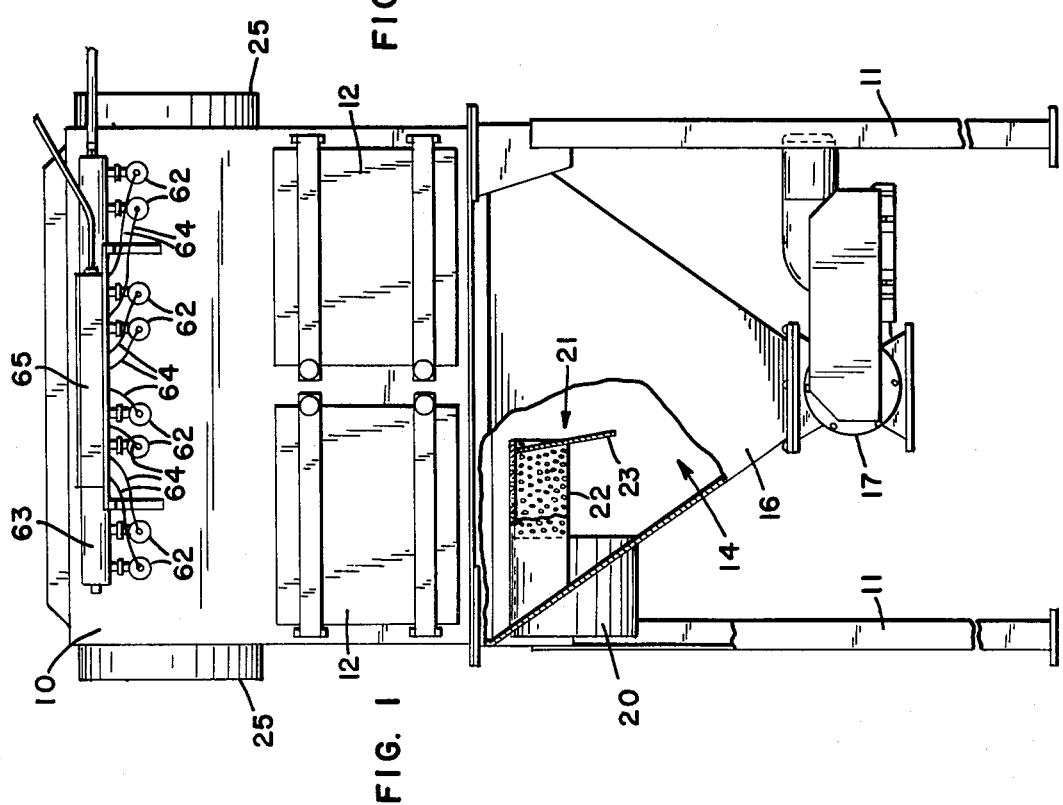
FIG. 1 is a front elevational view of an air filter embodying the invention, parts being broken away for clarity.
Figure 3:
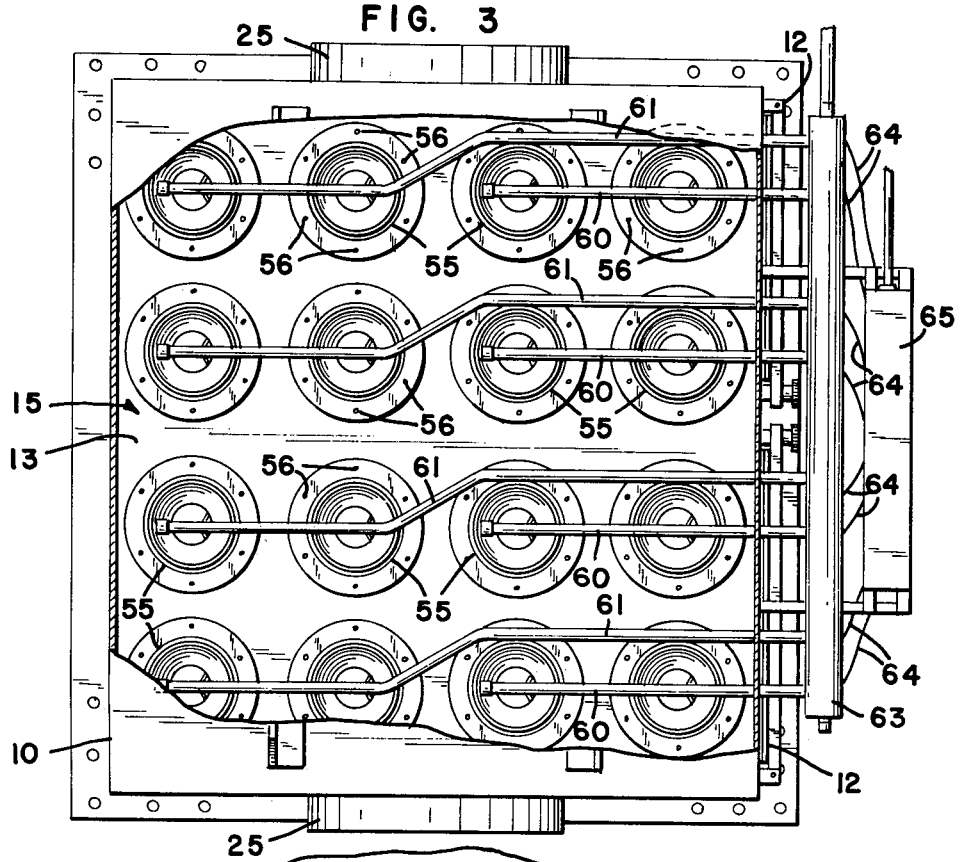
FIG. 3 is a similar plan view.

Turning first to FIGS. 1–3, a filter according to the invention is shown to comprise a housing 10 mounted on suitable legs 11 and provided with access doors 12. The housing is divided by a horizontal partition or tube sheet 13 into first and second chambers, an inlet chamber or plenum 14 and a clean air chamber or plenum 15. The lower portion of chamber 14 is formed as a hopper 16, having at its bottom a discharge valve 17 of the usual type which may be driven by a suitable motor. Air containing particulate matter is admitted to first chamber 14 at an inlet 20 which includes a deflector 21 made up of a semicylinder 22 of perforated metal carrying at its end a disc 23 of imperforate metal preferably arranged at an angle of about 77° with respect to the longitudinal axis of the inlet. The perforations in semicylinder 22 may conveniently be half an inch in diameter, and may occupy about 50% of the area.

Partition 13 is shown as having an array of apertures 24 for passage of air from first chamber 14 into second chamber 15, from which it is removed or exhausted through outlets 25 which also serve to give access to chamber 15. Flow of air through the filter may be produced by a fan or pump drawing the air from the outlets 25, or forcing it into inlet 20, at the choice of the user. In one embodiment of the invention inlet 20 had a diameter of 18 inches and outlets 25 had a diameter of 20 inches. For a flow of 6600 cubic feet per minute this resulted in an inlet velocity of 3730 feet per minute and an exhaust velocity of 3025 feet per minute.

Figure 5:
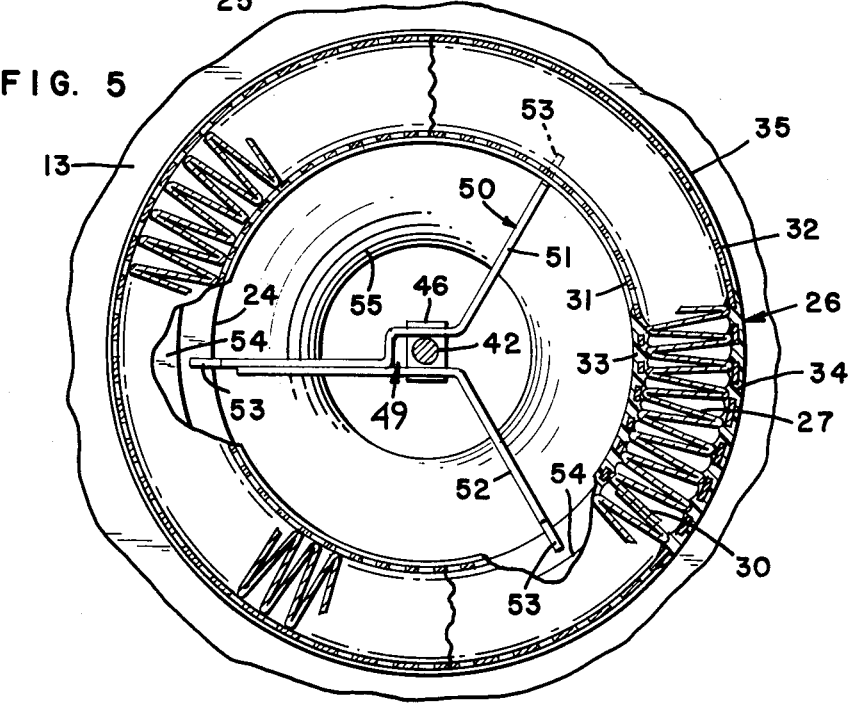
FIG. 5 is a fragmentary sectional view taken along the line 5—5 of FIG. 4.

Mounted in first chamber 14 below the apertures in partition 13 is an array of pleated paper filter elements 26, best shown in FIGS. 2, 4 and 5. Each filter element 26 is shown to comprise a hollow cylinder 27 of pleated porous paper, which is the actual filter medium, having one closed end and one open end, folds in the pleats running parallel to the longitudinal axis of the cylinder, and the first and last pleats being cemented or otherwise secured together as suggested at 30. Cylinder 27 is contained between an inner screen 31 and an outer screen 32, both of perforated metal. The inner folds of the pleats are secured to the inner screen 31 at intervals of a few inches along the cylinder by beads of adhesive 33, and the outer folds are similarly secured to the outer screen 32 by beads 34. At one open end of the element the screens and the pleats are secured to a ring 35 of imperforate material by adhesive 36, and at the opposite or other, closed end the screens and the pleats are secured to a disc 37 by adhesive 40. Disc 37 closes the end of the filter element and has a central depression 41 which is apertured to pass a tie rod 42 secured to the disc by a pair of nuts 43 and 44 and suitable lock washers 45.

The free end of tie rod 42 threadedly engages a barrel nut 46 which is received in notches 47 in the upper face 48 of a three legged spider 50 secured to the lower surface of partition 13 and centered in aperture 24. As shown in FIG. 5 the spider is an assembly of two members 51 and 52 spot welded together to form a generally Y-shaped unit having three legs which are welded on edge to partition 13. Near the center of the spider, where notches 47 for barrel nut 46 are located, member 51 is bent to define a smaller U-shaped opening 49, the legs of which comprise central walls of the spider and are spaced by slightly more than the diameter of tie rod 42. At their outer ends the legs of spider 50 are cut away as at 53 to fit within the inner screen 31. Associated with each aperture is an annulus 54 of compressible material such as rubber, which makes a seal between the partition and the adjacent open end of the filter element when the element, and therefore rod 42, is screwed tightly into the barrel nut 46.

It will be seen that the path for air flow from chamber 14 to chamber 15 is radially inward through screens 32, cylinders 27 and screens 31 of the filter elements, then through the insides of these elements and past spiders 50. Dust and other particulate matter collects on the outer surfaces of the filter elements, and must periodically be removed to clean the elements and restore their efficiency.

The cleaning is accomplished by a reverse jet cleaning means, including an ejector pump having a venturi 55, associated with each aperture in partition 13. The venturis are located in chamber 15 and are secured to partition 13 in centered relation to the apertures by rivets 56. Spaced from and coaxial with the venturis are nozzles 57 through which short bursts or pulses of clean compressed air are projected as jets through the venturis into the filter elements in a predetermined, timed sequence in a direction opposite to that of the normal air flow. The nozzles may conveniently be no more than properly positioned radial holes in pipes extending laterally above the venturis.

It has been found that when sixteen filter elements are used, as indicated in FIG. 3, efficient system operation can be accomplished when two elements are cleaned at once, fourteen elements remaining in normal service. Accordingly 8 cleaning pipes 60, 61 extend into chamber 15 from a like number of solenoid valves 62 which may be energized to place the pipes in communication with a manifold 63 supplying air at 90–100 PSIG. Pipes 60 are short and straight, passing directly over the centers of venturis nearer the manifold, and pipes 61 are longer and offset to pass directly over the centers of venturis remote from the manifold. Each pipe has two nozzles, properly located to supply jets to its associated venturis.

Valves 62 are connected by suitable electrical conductors 64 to a junction box 65 which contains or is suitably connected to a timer for energizing the valves in a predetermined sequence. It has been found that an electrical pulse 50 milliseconds long results in a valve opening for about 1/10 of a second, and that the resulting air pulse of say $\frac{3}{4}$ SCFM is brief enough and abrupt enough to have the desired cleaning effect in the two filter elements. The valves are repeatedly operated in a predetermined order. It is a matter of choice, to be determined by the user, how often the cycle of operation of all eight valves takes place: they preferably operate at equal intervals, and the cylce length may vary between half a minute and eight minutes or more.

Numerous characteristics and advantages of the invention have been set forth in the foregoing description, together with the details of the structure and function of the invention, and the novel features thereof are pointed out in the appended claims. The disclosure, however, is illustrative only, and changes may be made in detail especially in matters of shape, size and arrangement of parts, within the principle of the invention, to the full extent indicated by the broad general meaning of the terms in which the appended claims are expressed.

What is claimed is:

1. Dust collector apparatus for cleaning on a continuous basis a large volume of air laden with particulate matter at a predetermined rate, in terms of volume per unit time, comprising, in combination:

a housing;

a partition dividing said housing into first and second chambers, and having a plurality of apertures therein;

a like plurality of filter elements each capable of providing a normal filtering function, and each comprising a hollow cylinder of pleated porous paper filter medium having one closed end and one open end, each filter element having a known filter area and a rated velocity for its normal filtering function;

means mounting said filter elements in the first chamber with their open ends communicating with said apertures;

means for admitting said air laden with particulate matter into said first chamber;

means for exhausting air from said second chamber so that air normally flows radially through said filter elements at said predetermined rate and said matter collects on surfaces of said elements;

reverse jet cleaning means in said housing, including a nozzle aligned with each said aperture, for periodically removing the matter collected on surfaces of said filter elements by directing brief pulses of air at high pressure into said elements at predetermined intervals in a direction opposite to that of the normal air flow; and means for operating the filter elements at a grossly derated flow velocity so that said pleated paper filter medium can withstand the stresses placed upon it by the reverse jet cleaning, comprising said plurality of filter elements having a total filter area sufficient to reduce the velocity of air flow through each filter element to a velocity substantially lower than said rated velocity, said derated velocity being approximately one-three feet per minute.

2. In a dust collector apparatus for cleaning air at a predetermined rate in terms of volume per unit time, including in combination with a housing:

means forming first and second chambers in said housing including a partition having a plurality of apertures therein;

means for admitting said air into said first chamber, and means for exhausting air from said second chamber, whereby said air normally flows through said apertures, and through said second chamber at said predetermined rate;

a like plurality of hollow filters each capable of providing a normal filtering function, each having a closed end and an open end, and each filter having a known filter area and a rated velocity on the order of eight to ten feet per minute for its normal filtering function;

means mounting said filters in the first chamber with their open ends communicating with said apertures so that said air normally flows radially through said filters at said predetermined rate and dust in the air collects on surfaces of said filters; and reverse jet cleaning means in said housing, including a nozzle aligned with each said aperture, for periodically removing the dust collected on surfaces of said filters by directing brief pulses of air at high pressure into said filters at predetermined intervals in a direction opposite to that of the normal air flow;

the improvement comprising said plurality of filters comprising pleated porous paper filter elements being operated at derated velocities comprising said filter elements having a total filter area sufficient to reduce the velocity of air flowing through each filter element to approximately one to three cubic feet per minute per square foot of filter area so that the filter elements can withstand the stresses placed upon said pleated paper by the reverse jet cleaning.

3. Apparatus for cleaning air at a predetermined rate in terms of volume per unit time, comprising in combination with a housing;

means forming first and second chambers in said housing including a partition having a plurality of apertures therein;

means for admitting said air into said first chamber, and means for exhausting air from said second chamber, whereby air normally flows through said apertures and through said second chamber at said predetermined rate;

a like plurality of hollow filter elements each capable of providing a normal filtering function, each comprising a pleated porous paper filter medium and having a closed end and an open end, and each filter element having a rated velocity for its normal filtering function and a known filter area;

means mounting said filter elements in the first chamber with their open ends communicating with said apertures so that said air normally flows radially through said filter elements at said predetermined rate and particulate matter carried by the air collects on surfaces of said elements;

reverse jet cleaning means in said housing for periodically removing the matter collected on surfaces of said filter elements by directing brief pulses of air at high pressure into said elements at predetermined intervals in a direction opposite to that of the normal air flow; and means for grossly derating said filter elements so that the particulate matter can be periodically removed during reverse jet cleaning and said pleated paper filter medium can withstand the stresses placed upon it by the reverse jet cleaning, comprising said plurality of filter elements having a total filter area sufficient to reduce the velocity of air flow through each filter element to a velocity substantially lower than said normal rated velocity.

4. Dust collector apparatus for cleaning air at a predetermined rate in terms of volume per unit time, comprising in combination:

means forming a chamber including a sheet having a plurality of apertures therein for admitting air into said chamber;

means for exhausting air from said chamber, whereby air normally flows through said apertures and said chamber at said predetermined rate;

a like plurality of hollow filter elements each capable of providing a normal filtering function, each comprising a pleated porour paper filter and having a closed end and an open end, and each filter element having a known filter area and a rated velocity for its normal filtering function;

means mounting said filter elements with their open ends communicating with said apertures so that said air normally flows radially through said filter elements at said predetermined rate and dust in the air collects on surfaces of said elements;

reverse jet cleaning means in said chamber, including a nozzle aligned with each said aperture, for periodically removing the dust collected on surfaces of said filter elements by directing brief pulses of air at high pressure into said elements at predetermined intervals in a direction opposite to that of the normal air flow;

said plurality of filter elements having a total filter area sufficient to reduce the velocity of air flowing through each filter element to approximately one-quarter of said normal rated velocity so that the filter elements can withstand the stresses placed upon said pleated paper filters by the reverse jet cleaning.

5. Apparatus for cleaning air at a predetermined rate in terms of volume per unit time, comprising in combination:

means forming a chamber including a sheet having a plurality of apertures therein for admitting air into said chamber;

a like plurality of hollow filter elements each capable of providing a normal filtering function, each comprising a pleated porous paper filter and having a closed end and an open end, and each filter element having a rated velocity for its normal filtering function and a known filter area;

means mounting said filter elements with their open ends communicating with said apertures;

means for exhausting air from said chamber so that said air normally flows radially through said filter elements at said predetermined rate and particulate matter carried by the air collects on surfaces of said elements;

reverse jet cleaning means in said chamber for periodically removing the matter collected on surfaces of said filter elements by directing brief pulses of air at high pressure into said elements at predetermined intervals in a direction opposite to that of the normal air flow; and means for grossly derating said filter elements so that the particulate matter can be periodically removed during reverse jet cleaning and said pleated paper filters can withstand the stresses placed upon them by the reverse jet cleaning, comprising said plurality of filter elements having a total filter area sufficient to reduce the velocity of air flow through each filter element to a velocity substantially lower than said normal rated velocity.

6. The apparatus of claim 5 wherein the total filter area is such that the velocity of air flowing through each filter element is between about one to three cubic feet per minute per square foot of filter area.

7. The apparatus of claim 5 wherein the total filter area is increased by a factor of about four over that of the total filter area used for normal rated velocities.

8. The apparatus of claim 5 wherein the total filter area is such that the velocity of air flowing through each filter element is about two feet per minute.

9. The apparatus of claim 5 wherein each filter element is of a size so as to reduce the velocity of air flow to approximately one-quarter of said normal rated velocity.

* * * * *